(12) United States Patent
Philippart et al.

(10) Patent No.: US 10,066,875 B2
(45) Date of Patent: Sep. 4, 2018

(54) HEAT EXCHANGER OF A TURBOMACHINE

(71) Applicant: SNECMA, Paris (FR)

(72) Inventors: Gabriela Philippart, Paris (FR); Imane Ghazlane, Paris (FR); Julien Szydlowski, Montrouge (FR)

(73) Assignee: SNECMA, Paris (FR)

( * ) Notice: Subject to any disclaimer, the term of this patent is extended or adjusted under 35 U.S.C. 154(b) by 556 days.

(21) Appl. No.: 14/605,223

(22) Filed: Jan. 26, 2015

(65) Prior Publication Data
US 2015/0211801 A1 Jul. 30, 2015

(30) Foreign Application Priority Data

Jan. 29, 2014 (FR) ..................... 14 00220

(51) Int. Cl.
F28D 15/00 (2006.01)
F02K 3/115 (2006.01)
(Continued)

(52) U.S. Cl.
CPC ............... F28D 15/00 (2013.01); F02C 7/14 (2013.01); F02K 3/115 (2013.01); F28F 1/12 (2013.01);
(Continued)

(58) Field of Classification Search
CPC .. F28D 15/00; F02C 7/14; F02C 7/141; F02C 7/08; F02K 3/115; F28F 1/12; F28F 2215/02; F28F 2215/04; F28F 2215/06; F28F 2215/10; F05D 2260/213; F05D 2260/2214; F05D 2260/22141; Y02T 50/671; Y02T 50/675
See application file for complete search history.

(56) References Cited

U.S. PATENT DOCUMENTS 3,886,639 A * 6/1975 Pasternak .............. B21D 31/00
165/181
5,984,636 A 11/1999 Fahndrich et al.
(Continued)

FOREIGN PATENT DOCUMENTS

EP 2 607 831 A1 6/2013
WO WO 99/32761 A1 7/1999
(Continued)

OTHER PUBLICATIONS

French Preliminary Search Report and Written Opinion dated Oct. 22, 2014 in Patent Application No. 1400220 (with English translation of categories of cited documents).

Primary Examiner — Jessica Cahill
Assistant Examiner — Daphne M Barry
(74) Attorney, Agent, or Firm — Oblon, McClelland, Maier & Neustadt, L.L.P.

(57) ABSTRACT

A heat exchanger for an air circulation channel of a turbomachine, with the heat exchanger being configured to be passed through by a fluid to be cooled, is provided. The heat exchanger includes a plurality of fins protruding with respect to a support surface, each fin extends axially over a length in the direction of the circulation of air and includes a leading edge and a trailing edge. Each fin further includes a central body, between the leading edge and the trailing edge, with the central body having, in a plane parallel to the support surface, a curved central profile.

10 Claims, 5 Drawing Sheets

(51) Int. Cl.
*F02C 7/14* (2006.01)
*F02F 1/12* (2006.01)
*F28F 1/12* (2006.01)

(52) U.S. Cl.
CPC ............... *F05D 2260/213* (2013.01); *F05D 2260/22141* (2013.01); *Y02T 50/671* (2013.01); *Y02T 50/675* (2013.01)

(56) References Cited

U.S. PATENT DOCUMENTS

| | | | | |
|---|---|---|---|---|
| 6,313,399 B1 * | 11/2001 | Suntio | ................... | H01L 23/367 |
| | | | | 174/16.3 |
| 6,698,511 B2 * | 3/2004 | DiBene, II | .......... | H01L 23/3672 |
| | | | | 165/185 |
| 7,079,390 B2 * | 7/2006 | Barr | ...................... | H01L 23/467 |
| | | | | 165/80.3 |
| 9,238,284 B2 * | 1/2016 | Swinford | ................. | B23H 7/02 |
| 2012/0114467 A1 | 5/2012 | Elder | | |
| 2012/0237332 A1 | 9/2012 | Bulin et al. | | |
| 2013/0153184 A1 | 6/2013 | Rolt et al. | | |
| 2015/0315923 A1 * | 11/2015 | Bordoni | ................... | F01D 9/04 |
| | | | | 415/175 |

FOREIGN PATENT DOCUMENTS

| WO | WO 2010/136710 A2 | 12/2010 |
|---|---|---|
| WO | WO 2013/150248 A1 | 10/2013 |

\* cited by examiner

HEAT EXCHANGER OF A TURBOMACHINE

GENERAL TECHNICAL FIELD

The invention relates to a heat exchanger of an air circulation channel of a turbomachine.

Such an exchanger is particularly suited to be installed in a turbomachine of an aircraft and, more specially, an aircraft turbojet.

STATE OF THE ART

A turbomachine comprises many elements such as roller bearings that support the shaft or shafts of the turbomachine, which require being both lubricated and cooled. Also, it is known to supply these elements with "cold" oil.

As such, certain turbomachines are provided with a surface air-oil exchanger of the SACOC (Surface Air-Cooled Oil-Cooler) type, arranged in an air circulation channel of the turbomachine. In this SACOC type air-oil exchanger are arranged a multitude of channels wherein circulates the oil to be cooled. The exchanger comprises a corps surmounted with fins that have an isosceles trapezoidal profile. These fins increase the heat exchange surface between the oil to be cooled circulating in the channels of the body and the air circulating in the air circulation channel of the turbomachine. However, these fins also generate undesirable load losses.

PRESENTATION OF THE INVENTION

The invention makes it possible to improve the heat exchangers of a known type and relates to this effect to a heat exchanger for an air circulation channel of a turbomachine, with the heat exchanger being configured to be passed through by a fluid to be cooled and comprises a plurality of fins that protrude with respect to a support surface, each fin extends axially over a length in the direction of the circulation of air and comprises a leading edge and a trailing edge, the heat exchanger being characterised in that each fin further comprises a central body, between the leading edge and the trailing edge, with the central body having in a plane parallel to the support surface a curved central profile.

The invention is advantageously supplemented by the following characteristics, taken individually or in any technically permissible combination of them:

The curved central profile of the fin is defined by a Bézier curve such that $$P(u) = \sum_{i=0}^{n} B_{i,n} \bigg| P_i = \sum_{i=0}^{n} \binom{n}{i} u^i (1-u)^{n-i} P_i$$

with u a parameter varying from zero to one in order to characterise a point of the curve, Pi the coordinates, in the plane parallel to the support surface, control points of the Bezier curve and n the number of control points, n being greater than or equal to three, the second point can be placed between 0% and 70% of the central body, the third point is placed according to the position of the second point and can be placed between 20% and 100% of the central body.

The leading edge and the trailing edge respectively have a leading profile and a trailing profile in the plane parallel to the support surface, with the leading profile forming an acute angle with the trailing profile.

The acute angle is between 2° and 10°, typically between 3° and 4°.

The leading edge represents between 10% and 20% of the length of the fin.

The central body represents between 70% and 85% of the length of the fin.

The trailing edge represents between 5% and 10% of the length (L) of the fin (20).

The advantages of the invention are multiple.

The curved profile of the fin makes it possible to reduce the length of the latter, while still retaining the same exchange surface. Consequently, the length of the exchange device in contact with the fins (oil ducts inside) is also reduced which makes it possible to optimise its isothermal exchange mass.

In particular, in the case where the air circulation channel is a secondary stream of a turbomachine, the shape of the fins makes it possible to absorb the residual gyration. Indeed, the fan creates a gyrating flow, and although the outlet rectifier vanes, more commonly known as OGV, rectify the flow in order to align it with the drive shaft, there still subsists a residual gyration. There is residual gyration if the flow of the fluid behind the OGVs is according to a non-zero angle with respect to the drive shaft.

PRESENTATION OF THE FIGURES

Other characteristics, purposes and advantages of the invention shall appear in the following description, which is solely for the purposes of illustration and is not restricted, and which must be read with regards to the annexed drawings wherein:

FIG. 1 diagrammatically shows a turbomachine;

In all of the figures, similar elements bear identical references.

DETAILED DESCRIPTION OF THE INVENTION

In what follows, "turbomachine" means any machine that makes it possible to convert the thermal energy of a working fluid into mechanical energy by expansion of said working fluid in a turbine. More particularly, this working fluid can be a combustion gas resulting from the chemical reaction of a fuel with air in a combustion chamber. As such, the turbomachines, such as described here, comprise single-spool or twin-spool turbojets, turboprops, turboshaft engines or gas turbines, among others.

Figure 1:
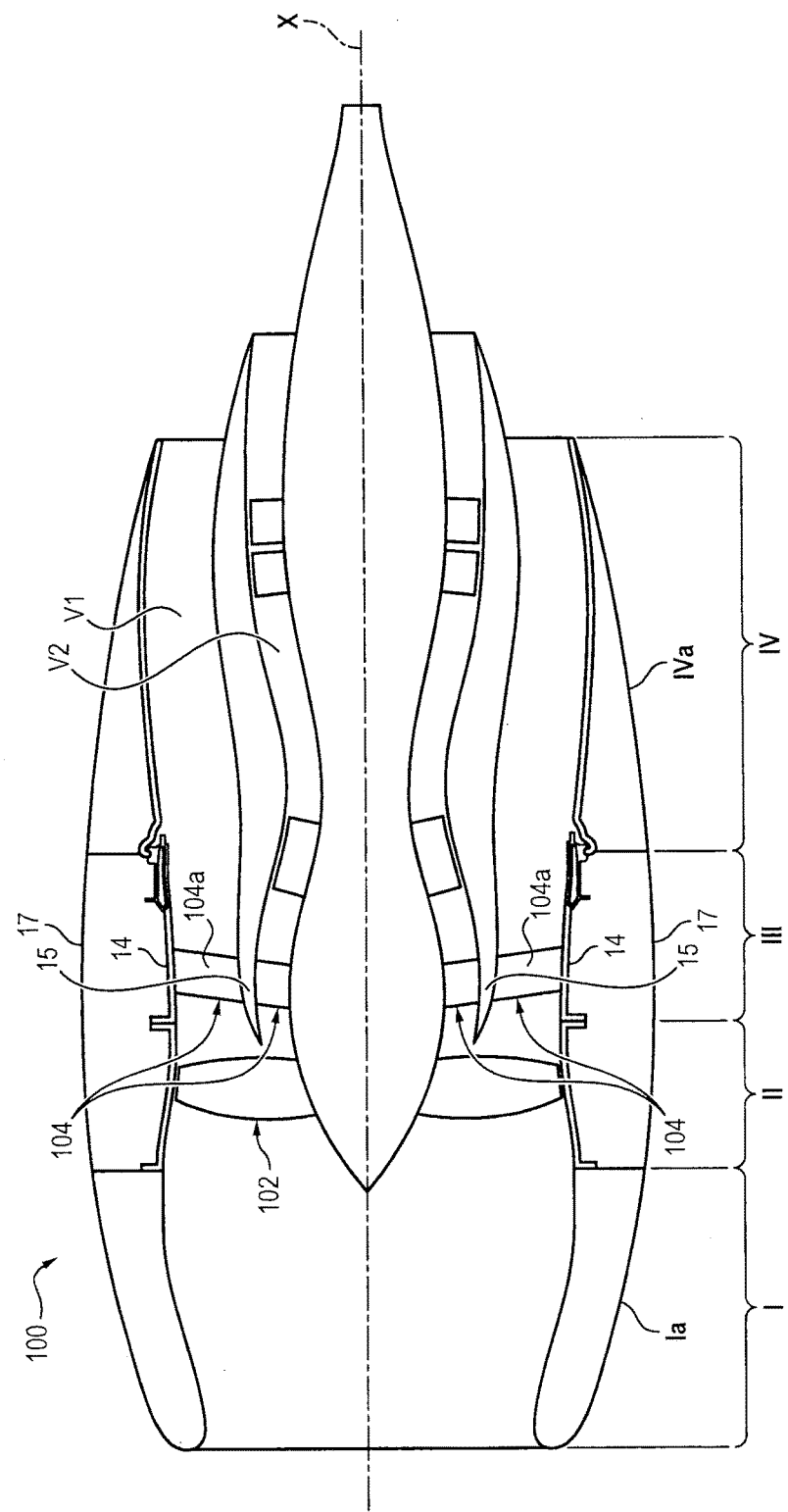

In what follows, the terms "upstream" and "downstream" are defined with respect to the normal direction of circulation of the air in the air circulation channel of the turbomachine. FIG. 1 is a schematic view of a turbomachine 100 extending according to an axial direction corresponding to the main axis of rotation X of the fan. From upstream to downstream, the turbomachine 100 successively comprises the following exterior casings: an air inlet casing I, a fan casing II arranged around a fan 102, an intermediate casing III connected to radial arms and sustaining all of the rotors and stators of the turbomachine 100 and a thrust reverser casing IV. In this example, the turbomachine 100 is a turbojet twin-spool engine, but can of course be, according to an alternative, a single-stage and/or single-spool turbojet.

The intermediate casing III comprises a intermediate casing ferrule 14, a flow separator 15 that radially separates the primary stream V1 of the gases from the secondary stream V2 of gases, with the ferrule 14 and the flows separator 15 being connected by portions of rectifier vanes 104a. Of course, in the case where the turbomachine is a single-stage turbojet, the intermediate casing does not have a flow separator.

The fan casing II and the intermediate casing III are covered, on the outside, by an exterior cowl 17, generally called a "fan cowl", extending axially and azimuthally around the fan casing II and the intermediate casing III. This exterior cowl 17 provides for the geometrical continuity of the exterior of the turbomachine 100 between the air inlet casing I and the exterior IVa of the thrust reverser casing IV.

In what follows, it is considered that the air circulation channel in the sense of the invention is related for example to the secondary stream V2 of the turbomachine shown in FIG. 1.

Figure 2:
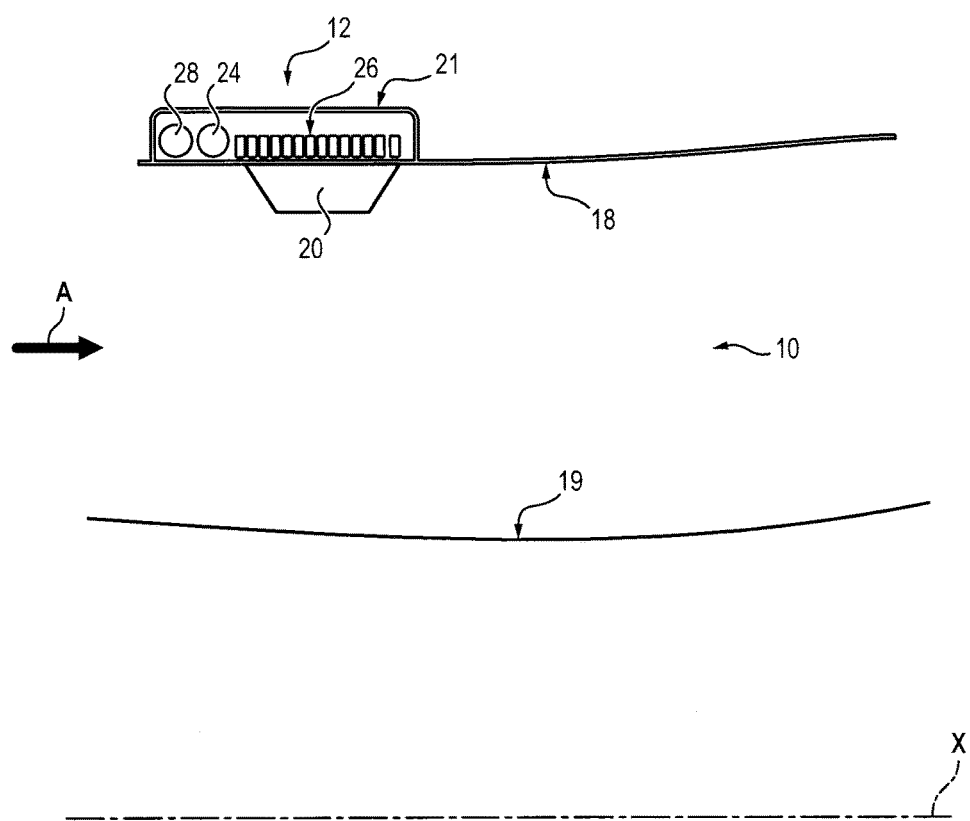
FIG. 2 shows a diagrammatical view of an air circulation channel of a turbomachine comprising a heat exchanger according to the invention.

FIG. 2 is a schematic view of the air circulation channel 10 of a turbomachine. This is an axial half-cross-section view with respect to its main axis X. The air circulation channel 10 is symmetrical or quasi-symmetrical around the axis X.

The turbomachine comprises a heat exchanger 12. In this example the heat exchanger is an air-oil heat exchanger 12 of the SACOC type. In the example, the heat exchanger 12 is arranged at the inlet of the air circulation channel 10.

In the rest of the description, the invention shall be described for any air circulation channel of a turbomachine delimited by a first structure 18 and a second structure 19 that can be respectively the ferrule 14 and the flow separator 15.

The direction wherein the air circulates in the air circulation channel 10 is materialised by the arrow A.

The heat exchanger 12 comprises, in this example, a body 21, which is a part of the first structure 18. The heat exchanger 12 is therefore partially integrated to the first structure 18 and is able to be partially annular in order to correspond to the ferrule 14. In other embodiments, the heat exchanger 12 can be partially integrated to the second structure 19.

Figure 3:
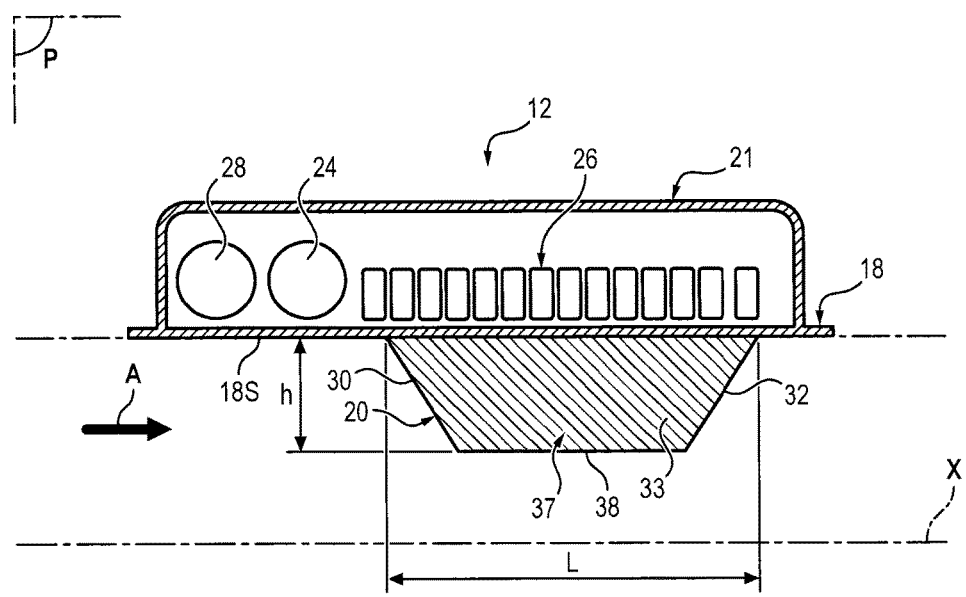
FIG. 3 shows a side view of a heat exchanger according to the invention.

The heat exchanger 12 comprises fins 20 connected to the body 21. Each fin 20 is protruding with respect to the first structure and extends in height in the air circulation channel 10. The fins 20 are more preferably parallel to one another. The first structure is hereinafter referred to as "support surface", FIG. 3 is a side view of the heat exchanger 12 taken according to a median surface P of a fin and perpendicular to the support surface 18 of the heat exchanger 12. This median surface extends approximately according to an axial cross-section plane comprising the main axis X of the turbojet.

The body 21 of the heat exchanger 12 comprises a inlet channel 24 of "hot" oil to be cooled, a plurality of channels 26 wherein circulates the "hot" oil, as well as an outlet channel 28 making it possible to recover the "cold" oil. The body 21 of the heat exchanger 12 can however comprise other inlet, circulation and outlet channels for the "hot" oil, As can be seen partially in FIGS. 2 and 3, the fins 20 providing the exchange of heat between the "hot" oil and the "cold" air circulating in the air circulation channel 10, are arranged circumferentially facing the second structure 19. These fins 20 are fixed to the body 21 of the exchanger 12 and protrude with respect to the surface 18S of the body 21, i.e. with respect to the surface 14S of the external fixed structure 14 which is the support surface. The fins 20 therefore protrude in the air circulation channel 10.

The fins 20 are arranged on channels 26 for the circulation of the "hot" oil. The "hot" oil that arrives in the body 21 of the exchanger 12 and which requires cooling, passes through the plurality of circulation channels 26. The heat given off by the "hot" oil is transferred to each fin 20 protruding in the air circulation channel 10 wherein cold air circulates. As such, the thermal energy "stored" in each fin 20, is transferred via a heat exchange surface from each fin 20 to the "cold" air, As shown in FIG. 3, each fin 20 extends axially in the median surface P according to the main axis X of the turbojet over a length L and comprises a leading edge 30 facing the flow of air and a trailing edge 32. Between the leading edge 30 and the trailing edge 32, each fin further comprises a central body 37. The leading edge 30 defines an upstream end of the fin while the trailing edge 32 defines a downstream end of the fin 20. The central body 37 stands above the support surface at a height h. This height h can be constant or variable in the direction of the length L of the fin 20.

Moreover, as shown more specifically in FIG. 3, each fin 20 comprises two lateral faces 33 that connect the leading edge 30 to the trailing edge 32 (a single lateral face 33 can be seen in FIG. 2). As such, the surface formed by the lateral faces 33 and delimited by the leading edge 30, the trailing edge 32 the central body 37 of the fin 20 defines a heat exchange surface. The heat exchange surface of each fin 20 is in contact with the "cool" air circulating in the air circulation channel 10, which makes it possible to cool the "hot" oil.

Figure 4:
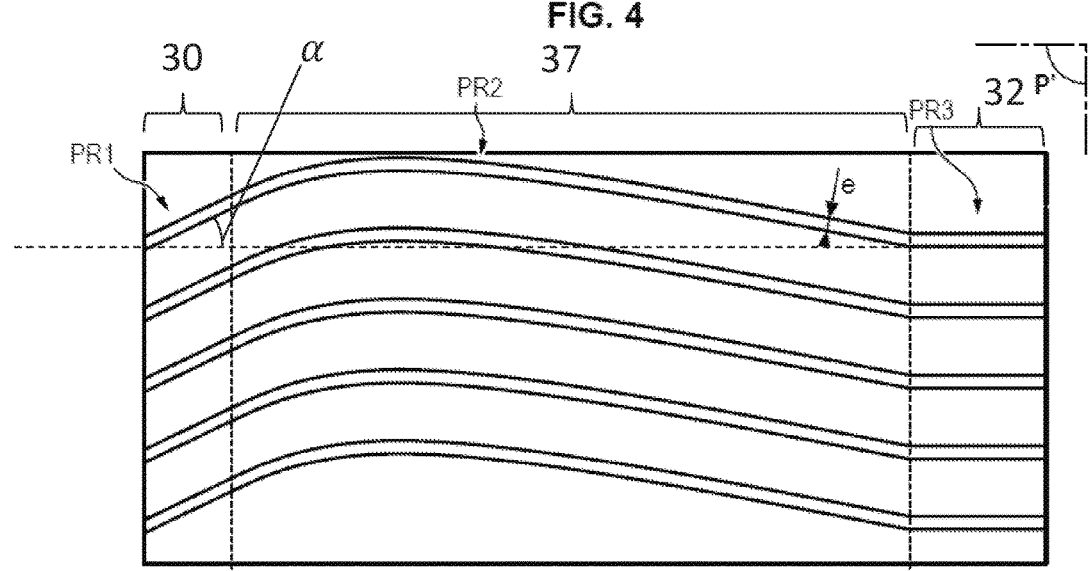
FIG. 4 shows a schematic top view of a heat exchanger according to the invention.
Figure 5:
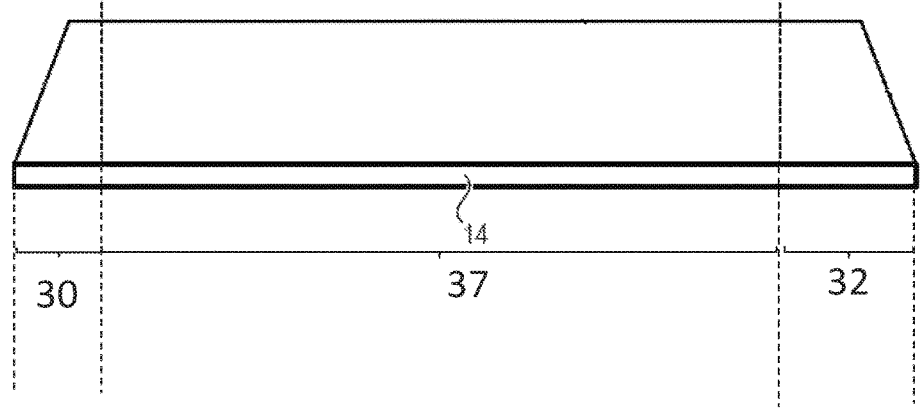
FIG. 5 shows a schematic profile view of a heat exchanger according to the invention.

As is shown in FIG. 4 and FIG. 5, the central body 37 of each fin 20 has in a plane P' parallel to the support surface a curved central profile $PR_2$ with respect to the main axis X of the turbojet.

Each fin 20 has a thickness e between 1 mm and 3 mms.

Figure 6:
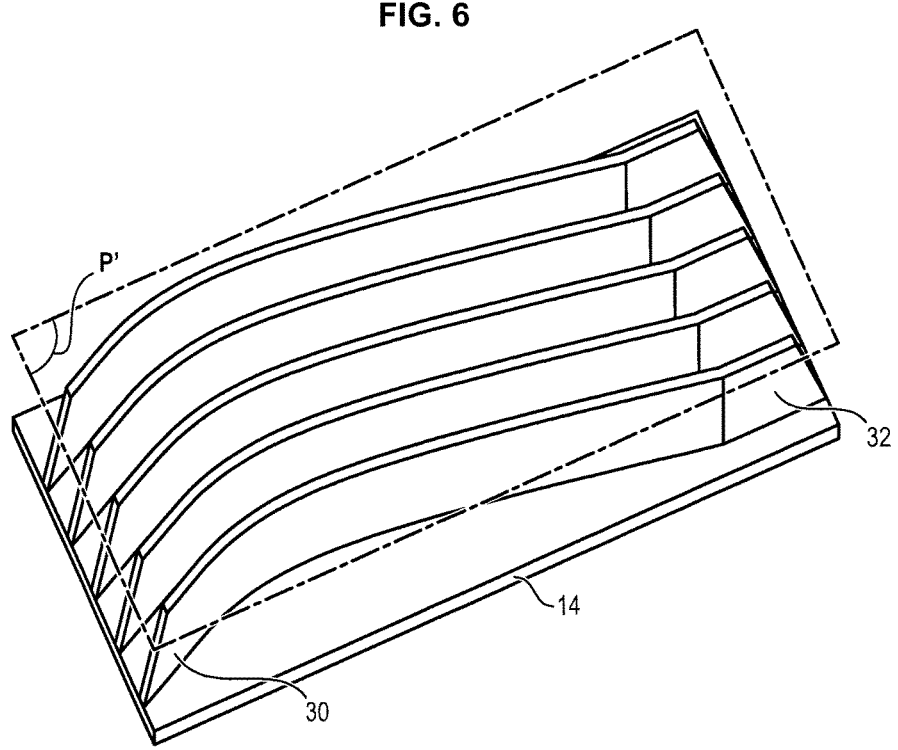
FIG. 6 shows a schematic side view of a heat exchanger according to the invention.

Furthermore, as is shown in FIG. 6 (and as already mentioned in relation with FIG. 3), the fin 20 has a trapezoidal side view.

Each fin 30 as such comprises a leading edge 30 that has a leading profile $PR_1$, a central body 37 that has a central profile $PR_2$ and a trailing edge 32 that has a trailing profile $PR_3$.

Advantageously, the leading edge 30 has a leading profile $PR_1$ in the plane P' parallel to the support surface forming an acute angle α with an axis parallel to the main axis X of the turbomachine. This angle α is between 2° and 10°, typically between 3° and 4°.

Such a leading edge 30 which is not oriented parallel to an axis parallel to the main axis X of the turbomachine but which is offset with respect to the latter makes it possible to absorb a residual gyration of the OGVs in the case where the air circulation channel 10 corresponds to a secondary stream V2 of a turbojet. Indeed, the fan creates a gyrating flow, and although the outlet rectifier vanes, known more commonly as OGVs, rectify the flow in order to align it with the drive shaft, there still subsists a residual gyration. There is residual gyration if the flow of the fluid behind the OGVs is according to a non-zero angle with respect to the drive shaft.

As such, in order to progressively rectify the flow coming from the leading edge the curved central profile $PR_2$ of the central body 37 of the fin 20 is preferably defined by a Bezier curve such that $$P(u) = \sum_{i=0}^{n} B_{i,n} \left| P_i = \sum_{i=0}^{n} \binom{n}{i} u^i (1-u)^{n-i} P_i \right.$$

with u a parameter varying from zero to one in order to characterise a point of the curve, Pi the coordinates in the plane P' parallel to the surface 14 support of control points of the Bezier curve and n the number of control points.

The junction of the profiles $PR_2$ and of the profile $PR_1$ advantageously has a continuity so as to contribute in limiting the load losses and progressively rectify the flow coming from the leading edge.

Finally, in order to guide the flow coming from the central body 37 parallel to the main axis X of the turbomachine, the trailing edge has a trailing profile $PR_3$ parallel to the direction of the circulation of the air. In other word, the profiles $PR_1$ and $PR_3$ therefore do not have the same orientation and form an acute angle α between 2° and 10°, typically between 3° and 4°.

Preferably, the leading edge 30 represents between 10% and 20% of the length L of the fin 20, and/or the central body represents between 70% and 85% of the length L of the fin 20 and/or the trailing edge represents between 5% and 10% of the length L of the fin 20.

Figure 7:
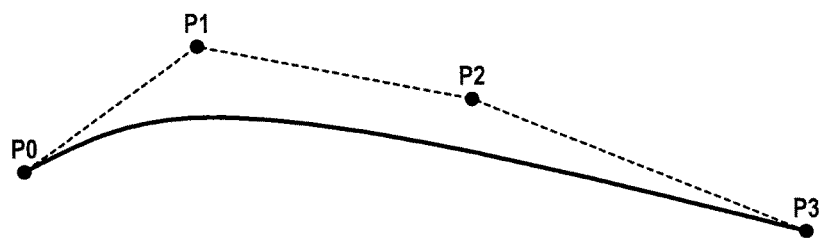
FIG. 7 shows a top view of a curved profile of the central body of a fin of an exchanger according to the invention.

In relation with FIG. 7, an example is described of a curved profile $PR_2$ of the central body 37 of the fin 20.

In this figure, the Bézier curve comprises four control points P0, P1, P2, P3. In particular, the first point P0 is placed at 0% of the central body 37 (i.e. at the very beginning of the central body 37) the fourth point P3 is placed at 100% of the central body 37 (i.e. at the end of the central body 37). The second point P1 can be placed between 0% and 70% of the central body 37, the third point P2 is placed according to the position of the second point P1 and can be placed between 20% and 100% of the central body. It is therefore possible that the third point P2 be confounded with the second point P1, with the curve then being defined by three points.

The location of these points is adapted so that the distribution of the curvature minimises the load losses and adapts to the fin length chosen. If the fins have to be shorter, the curvature is increased in order to provide the same exchange surface. The control points are located on the same side of the curve on FIG. 7 and constitute a preferred embodiment of the invention. However, it is also possible to position the second point P1 and third point P2 on either side of the curve in order to obtain a point of inflection. This embodiment increases the curvature and therefore the length required, while still minimising wherever possible the load losses.

The invention claimed is:

1. A turbomachine comprising:
   an air circulation channel delimited between a first structure and a second structure; and
   a heat exchanger for the air circulation channel of the turbomachine, with the heat exchanger being configured to be passed through by a fluid to be cooled, the heat exchanger comprising:
   a body, the body comprising an inlet channel of fluid to be cooled, a plurality of channels which circulates the fluid, and an outlet channel for recovering the cooled fluid, and
   a plurality of fins fixed to the body and arranged on the channels for a circulation of the fluid, the plurality of fins protruding in relation to a support surface, the support surface being a surface of one of the structures, each fin extends axially over a length and comprises, in a direction of the circulation of the air, a leading edge, a central body extending from the leading edge, and a trailing edge extending from the central body and having a trailing profile,
   wherein the central body, between the leading edge and the trailing edge, has, in a plane parallel to the support surface, a curved central profile, and
   wherein the trailing profile is parallel to the direction of circulation of air.

2. The turbomachine according to claim 1, wherein the curved central profile of the fin is defined by a Bézier curve such that $$P(u) = \sum_{i=0}^{n} B_{i,n} \left| P_i = \sum_{i=0}^{n} \binom{n}{i} u^i (1-u)^{n-i} P_i \right.$$

with u a parameter that varies from zero to one in order to characterise a point of the curve, Pi the coordinates, in the plane parallel to the support surface, control points of the Bézier curve and n a number of control points, with n being greater than or equal to three, a second point is placed at a distance between 0% of a length of the central body and 70% of the length of the central body, a third point is placed based on a position of the second point and placed between 20% of the length of the central body and 100% of the length of the central body.

3. The turbomachine according to claim 1, wherein the leading edge has a leading profile in the plane parallel to the support surface, the leading profile forming an acute angle with the trailing profile.

4. The turbomachine according to claim 3, wherein the acute angle is between 2° and 10°.

5. The turbomachine according to claim 1, wherein the leading edge represents between 10% and 20% of the length of each fin.

6. The turbomachine according to claim 1, wherein the central body represents between 70% and 85% of the length of each fin.

7. The turbomachine according to claim 1, wherein the trailing edge represents between 5% and 10% of the length of each fin.

8. The turbomachine as claimed in claim 1, wherein the circulation channel is a secondary stream of gases of an intermediate casing of a turbojet of said turbomachine.

9. The turbomachine as claimed in claim 3, wherein the heat exchanger is positioned with the leading profile forming an acute angle with respect to an axis parallel to the direction of circulation of the air and the trailing profile parallel to the direction of the circulation of the air.

10. The turbomachine according to claim 1, wherein the direction of circulation of air is parallel to an axis of the turbomachine.

* * * * *